(12) United States Patent
Norris et al.

(10) Patent No.: US 8,348,600 B2
(45) Date of Patent: Jan. 8, 2013

(54) GAS TURBINE ENGINE HAVING CONTROLLABLE INLET GUIDE VANES

(75) Inventors: James W. Norris, Lebanon, CT (US); Anton G. Banks, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 1522 days.

(21) Appl. No.: 12/127,104

(22) Filed: May 27, 2008

(65) Prior Publication Data

US 2009/0297334 A1 Dec. 3, 2009

(51) Int. Cl.
*F01D 9/04* (2006.01)

(52) U.S. Cl. ........ 415/160; 415/118; 415/162; 415/191; 415/1

(58) Field of Classification Search .................. 415/160, 415/162, 118, 191, 1
See application file for complete search history.

(56) References Cited

U.S. PATENT DOCUMENTS

| 4,972,671 A | | 11/1990 | Asselin et al. | |
|---|---|---|---|---|
| 5,042,245 A | * | 8/1991 | Zickwolf, Jr. | 60/773 |
| 6,045,325 A | | 4/2000 | Horvath et al. | |
| 6,619,916 B1 | | 9/2003 | Capozzi et al. | |
| 6,823,675 B2 | | 11/2004 | Brunell et al. | |
| 7,232,287 B2 | * | 6/2007 | Regunath | 415/160 |
| 7,762,084 B2 | * | 7/2010 | Martis et al. | 60/792 |
| 7,927,067 B2 | * | 4/2011 | Rajamani et al. | 415/118 |
| 8,066,474 B1 | * | 11/2011 | Jansen et al. | 415/160 |
| 2010/0172744 A1 | * | 7/2010 | Bhatnagar | 415/160 |

FOREIGN PATENT DOCUMENTS

WO 2006005999 A1 6/2006

* cited by examiner

*Primary Examiner* — Ninh H Nguyen
(74) *Attorney, Agent, or Firm* — Carlson, Gaskey & Olds PC

(57) ABSTRACT

An inlet guide vane assembly includes an active control feedback system and a plurality of inlet guide vanes. The inlet guide vanes are variable between a plurality of positions. Each of the plurality of inlet guide vanes is positioned in response to an output of the activate control feedback system.

28 Claims, 5 Drawing Sheets

GAS TURBINE ENGINE HAVING CONTROLLABLE INLET GUIDE VANES

BACKGROUND OF THE DISCLOSURE

This disclosure generally relates to gas turbine engines, and more particularly to controllable inlet guide vanes for a gas turbine engine.

Gas turbine engines typically include at least a compressor section, a combustor section and a turbine section. During operation, air is pressurized in the compressor section and mixed with fuel in the combustor section for generating hot combustion gases. The hot combustion gases flow through the turbine section which extracts energy from the hot combustion gases to power the compressor section.

Gas turbine engines also typically include an inlet section that directs incoming airflow into the compressor section for compression. The design of the inlet section, especially on high performance military aircraft, can effect the communication of the airflow into the compressor section.

For example, in some gas turbine engine applications, there may be a significant component of the airflow that is non-parallel to the inlet section. This non-parallel component may cause distortion of the airflow as it enters the inlet section. Distorted airflow has a non-uniform pressure and pressure swirl. Inlet sections that receive airflow having relatively high amounts of distortion may cause reduced engine stability and reduced performance.

SUMMARY OF THE DISCLOSURE

An inlet guide vane assembly includes an active control feedback system and a plurality of inlet guide vanes. The plurality of inlet guide vanes are variable between a plurality of positions. Each of the plurality of inlet guide vanes is positioned in response to an output of the active control feedback system.

A gas turbine engine includes an inlet section, a compressor section, a combustor section and a turbine section positioned downstream of the inlet section, a plurality of inlet guide vanes, and an active control feedback system. The plurality of inlet guide vanes are mounted adjacent to the inlet section. The active control feedback system includes a plurality of sensors and a controller. The controller receives pressure readings from the plurality of sensors and commands the positioning of each of the plurality of inlet guide vanes in response to the pressure readings.

A method of actively controlling a plurality of inlet guide vanes of a gas turbine engine includes receiving an airflow at an inlet section of the gas turbine engine, sensing a pressure of the airflow at the inlet section, and positioning each of the inlet guide vanes in response to sensing the pressure.

The various features and advantages of this disclosure will become apparent to those skilled in the art from the following detailed description. The drawings that accompany the detailed description can be briefly described as follows.

DETAILED DESCRIPTION OF THE DISCLOSED EMBODIMENT

Figure 1:
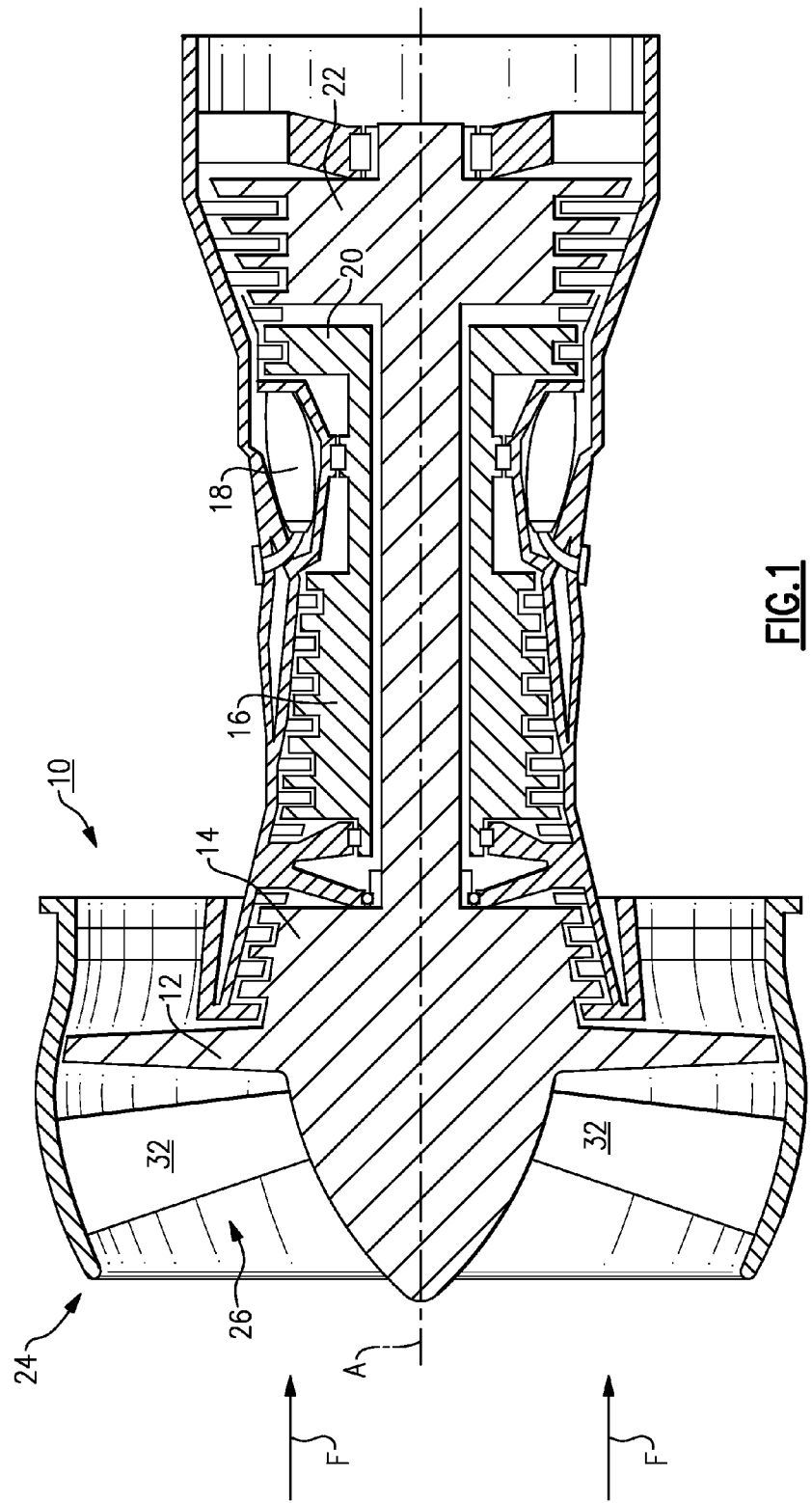
FIG. 1 schematically illustrates an example gas turbine engine.

FIG. 1 schematically illustrates an example gas turbine engine 10 that is circumferentially disposed about an engine centerline axis A. The gas turbine engine 10 includes (in serial flow communication) a fan section 12, a low pressure compressor 14, a high pressure compressor 16, a combustor section 18, a high pressure turbine 20 and a low pressure turbine 22.

The gas turbine engine 10 also includes an inlet section 24 and an inlet guide vane assembly 26 mounted adjacent to the inlet section 24. In one example, the inlet guide vane assembly 26 is mounted between the inlet section 24 and the fan section 12. The inlet guide vane assembly 26 includes a plurality of inlet guide vanes 32 that direct incoming airflow F that enters the gas turbine engine 10 downstream to the compressor sections 14, 16, for example.

During operation, incoming airflow F is communicated through the inlet guide vane assembly 26 and through the fan section 12, and is pressurized in the low pressure compressor 14 and the high pressure compressor 16. Fuel is mixed with the pressurized air and combusted within the combustor section 18. The combustion gases are discharged through the high pressure turbine 20 and the low pressure turbine 22, which extract energy from the combustion gases for powering the low pressure compressor 14, the high pressure compressor 16 and the fan section 12. Of course, this view is highly schematic. It should be understood that the various features and example illustrations presented herein are not limited to a gas turbine engine of this particular architecture. That is, the present disclose is applicable to any engine architecture, and for any application.

Figure 2:
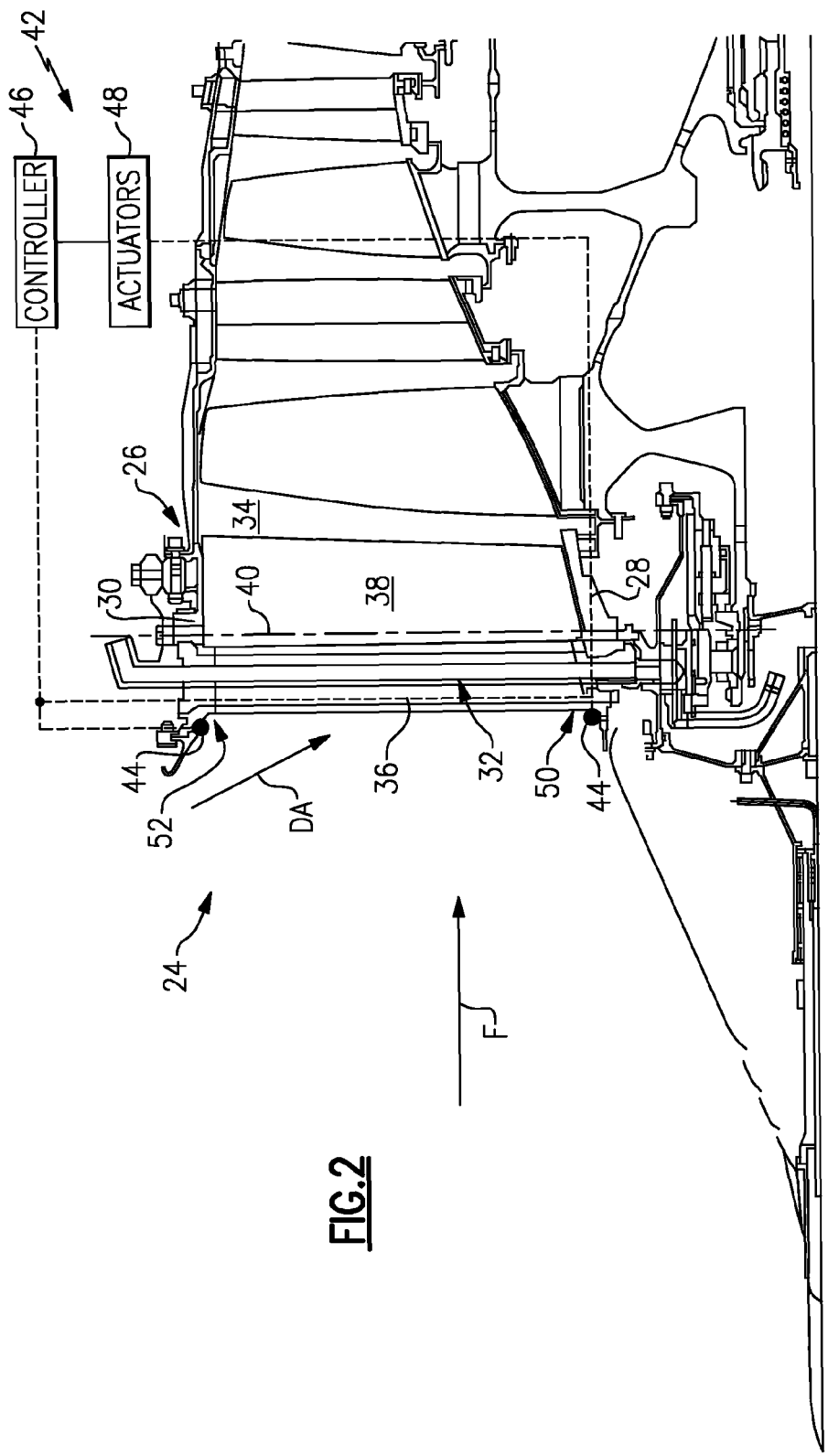
FIG. 2 illustrates a cross-sectional view of an inlet section of the gas turbine engine illustrated in FIG. 1.

FIG. 2 illustrates a portion of an inlet guide vane assembly 26 mounted adjacent to the inlet section 24 of the gas turbine engine 10. The inlet section 24 includes an inner shroud 28 and an annular casing 30 spaced radially outward relative to the inner shroud 28. An airflow flow path 34 extends between the inner shroud 28 and the annular casing 30. In one example, the inlet section 24 is a non-line of sight serpentine inlet section that receives a distorted airflow DA at a non-parallel angle relative to the gas turbine engine 10. However, any type of inlet section could benefit from the example inlet guide vane assembly 26 discussed herein.

A plurality of inlet guide vanes 32 extend radially from the inner shroud 28 to the annular casing 30 (only one shown in the cross-sectional view of FIG. 2). That is, the inlet guide vanes 32 are positioned within the flow path 34 of the inlet section 24. In this example, the inlet guide vanes 32 are fan inlet guide vanes. The plurality of inlet guide vanes 32 may be positioned independently or in sectors (i.e., pivoted in groups of two or more such that every inlet guide vane 32 in a group rotates together the same amount), as is further discussed below.

Each inlet guide vane 32 includes both a strut airfoil 36 and a flap airfoil 38. The strut airfoils 36 structurally support the annular casing 30 in a spaced relationship relative to the inner shroud 28. In one example, the strut airfoils 36 are spaced uniformly about the circumference of the inner shroud 28. Each strut airfoil 36 is fixably secured to the inner shroud 28 and to the annular casing 30. The strut airfoils 36 are aerodynamically shaped to deflect incoming airflow entering the inlet section 24 around the strut airfoils 36.

A flap airfoil 38 is associated with each strut airfoil 36 and is positioned immediately downstream from each strut airfoil 36. Each flap airfoil 38 is individually selectively rotatable about a reference axis 40 to vary a rotational position of each of the flap airfoils 38 relative to the strut airfoils 36. That is, each flap airfoil 38 of each inlet guide vane 32 is variable about the reference axis 40 that is transverse to the engine centerline axis A to individually position each flap airfoil 38.

The inlet guide vane assembly 26 further includes an active control feedback system 42. The active control feedback system 42 includes a plurality of sensors 44, a controller 46 and a plurality of actuators 48. In one example, the plurality of sensors 44 are pressure sensors that sense a pressure of incoming airflow F at the inlet section 24. A person of ordinary skill in the art having the benefit of this disclosure would be able to select an appropriate sensor for use within the active control feedback system 42. It should be understood that the actual number of sensors included with the active control feedback system 42 will vary depending upon design specific parameters including, but not limited to, the size of the gas turbine engine 10 and the design of the inlet section 24.

Figure 3:
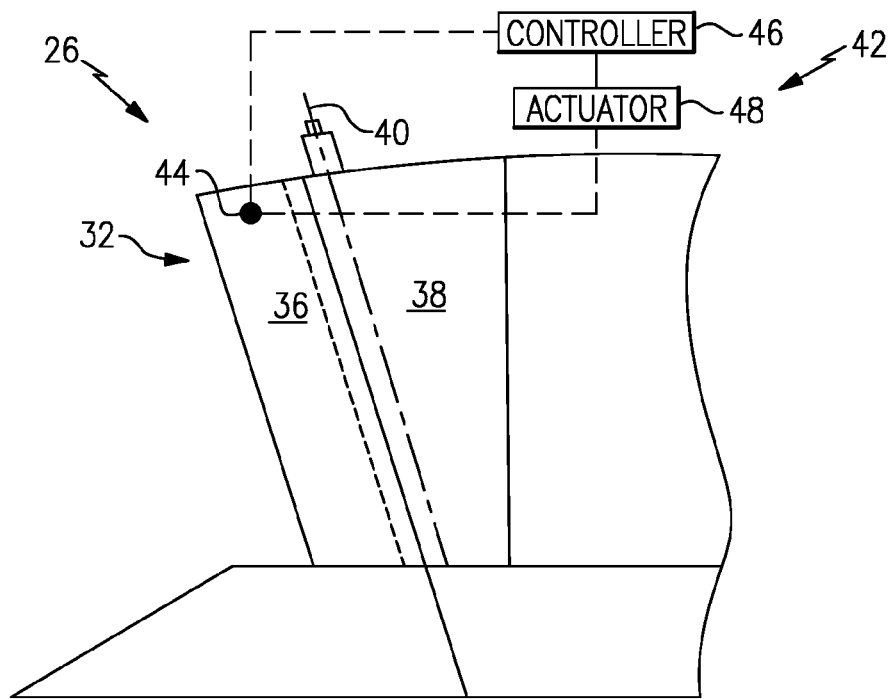
FIG. 3 illustrates an example mounting location of a sensor of an example active control feedback system.

The sensors 44 are uniformly spaced about the circumference of both an inner diameter 50 and an outer diameter 52 of the inlet section 24, in this example. In another example, the sensors 44 include a non-uniform spacing about the inlet section 24. In yet another example, at least one sensor 44 is positioned on each strut airfoil 36 of the inlet guide vane assembly 26 (See FIG. 3). The controller 46 is an engine control unit (ECU), in one example.

The active control feedback system 42 senses a pressure of the incoming airflow F at the inlet section 24 and individually positions (or positions in sectors) each of the inlet guide vanes 32 in response to sensing the pressure, as is further discussed below. That is, the active control feedback system 42 individually positions each flap airfoil 38 of each inlet guide vane 32 in response to the sensed pressures to improve the airflow profile for the fan section 12.

Figure 4:
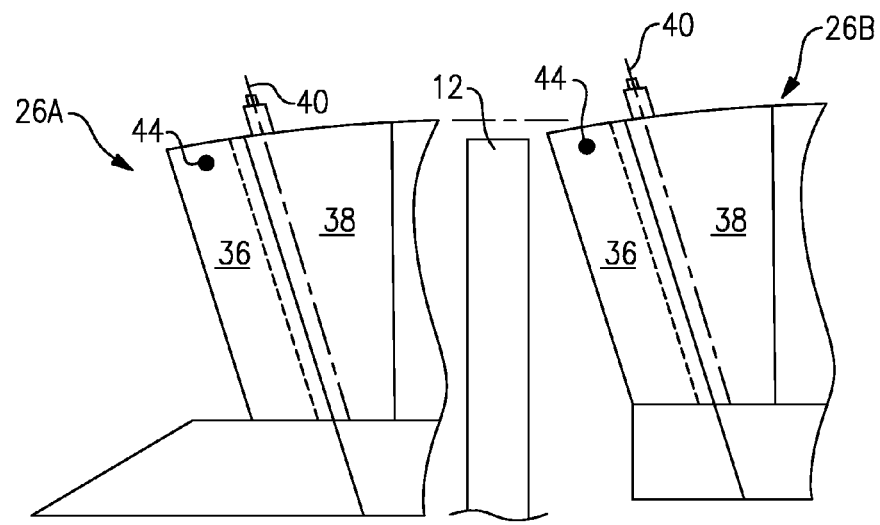
FIG. 4 illustrates a portion of a gas turbine engine including multiple inlet guide vane assemblies.

The gas turbine engine 10 may also include a multitude of inlet guide vane assemblies 26. In the example illustrated in FIG. 4, the gas turbine engine 10 includes a first inlet guide vane assembly 26A upstream from the fan section 12, and a second inlet guide vane assembly 26B positioned downstream from the fan section 12. A person of ordinary skill in the art having the benefit of this disclosure would understand that the actual number and positioning of the inlet guide vane assemblies 26 will vary depending upon design specific parameters, including but not limited to, the size and shape of the inlet section 24.

Figure 5:
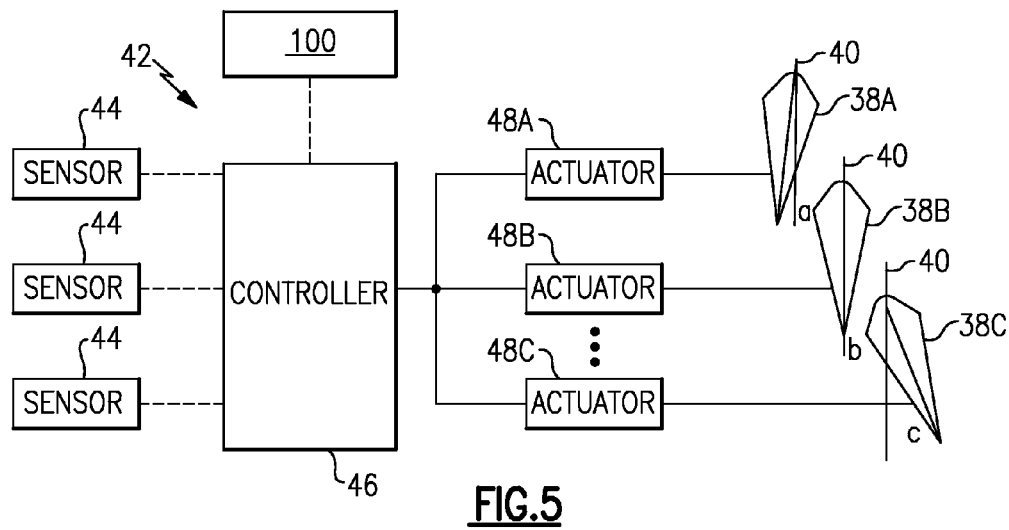
FIG. 5 schematically illustrates an inlet guide vane assembly including an active control feedback system.

FIG. 5 schematically illustrates the inlet guide vane assembly 26 including the example active control feedback system 42. In this example, three inlet guide vane 32 flap airfoils 38A, 38B and 38C are illustrated. A worker of ordinary skill in the art having the benefit of this disclosure would understand that the inlet guide vane assembly 26 could include any number of inlet guide vanes 32, and any number of flap airfoils 38.

Each sensor 44 of the active control feedback system 42 senses a pressure of the incoming airflow F that is communicated into the inlet section 24 of the gas turbine engine 10. In one example, at least a component of the incoming airflow F is distorted. That is, the incoming airflow F includes a non-uniform pressures and swirl.

Figure 6A:
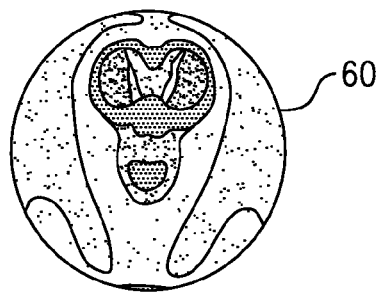
FIGS. 6A and 6B illustrate example distortions maps of an airflow at the inlet section of a gas tribune engine.

An output of each sensor 44, such as a pressure reading, for example, is communicated from each sensor 44 to the controller 46. The controller 46 receives the output of the sensors 44, and generates a distortion map 60 (See FIG. 6A) of the incoming airflow F. The distortion map 60 is based on the output from the sensors 44. It should be understood that the sensors 44 and the controller 46 are programmable to read and analyze the characteristics of incoming airflow F entering the inlet section 24.

In the example where multiple inlet guide vane assemblies 26 are utilized (See FIG. 4, for example), the controller 46 may receive (either alone or in addition to the input from sensors 44 of the second inlet guide vane assembly 26B) an input 100 to generate the distortion map 60. For example, the input 100 may include information on the positioning of each flap airfoil 38 of the inlet guide vane assembly/assemblies that are positioned upstream from the inlet guide vane assembly 26 to be positioned.

In one example, the controller 46 utilizes only the output from the sensors 44 to generate the distortion map 60 and determine how to position each flap airfoil 38 of the second inlet guide vane assembly 26B. In another example, the controller 46 utilizes only the input 100 to determine how to properly position each flap airfoil 38 of the inlet guide vane assembly 26. In yet another example, the controller 46 utilizes both the output from the sensors 44 and the input 100 to determine how to position each flap airfoil 38 of the second inlet guide vane assembly 26B.

A person of ordinary skill in the art having the benefit of the teachings herein would be able to program the controller 46 to analyze the output of the sensors 44 and/or input 100 to generate an appropriate distortion map 60 that is based upon these variables. Moreover, a person of ordinary skill in the art would be able to program the controller 46 to command the appropriate positioning of each flap airfoil 38 of each inlet guide vane 32 in response to the generated distortion map 60.

Each flap airfoil 38A-38C is controlled by an independent actuator 48A, 48B and 48C, respectively. The actuators are shown schematically in FIG. 4, but any known actuator could be utilized. For example, the actuators 48 may be hydraulic, electric motors, or any other type of suitable actuator. Each actuator 48A, 48B and 48C is operatively connected to its corresponding flap airfoil 38A, 38B and 38C, respectively. A person of ordinary skill in the art having the benefit of this disclosure would be able to operatively connect the actuators 48 to the flap airfoils 38.

The actuators 48A, 48B and 48C are independently controlled by the controller 46 to selectively vary the positioning of each flap airfoil 38A, 38B and 38C of the inlet guide vanes 32. That is, each flap airfoil 38A, 38B and 38C is selectively pivotable about the reference axis 40 that is transverse to the centerline axis A. In this example, each flap airfoil 38A, 38 and 38C is pivoted independently of the other flap airfoils 38A, 38B and 38C, respectively. It should be understood that although FIG. 5 illustrates the individual pivoting of each inlet guide vane 32, the inlet guide vanes 32 are also pivotable in sectors (i.e., pivoted in groups of two or more such that every flap airfoil in a group rotates together the same amount) (See FIG. 8).

In this example, as controlled by the controller 46 based upon the output from sensors 44 and/or input from an upstream inlet guide vane assembly 26, the flap airfoil 38A is pivoted by actuator 48A to an angle a relative to a plane extending radially through the flap airfoil 38A and the engine centerline axis A, the flap airfoil 38B is pivoted by actuator 48B to an angle b relative to a plane through the flap airfoil 38B and the engine centerline axis A, and the flap airfoil 38C is pivoted by the actuator 48C to an angle c relative to a plane through the flap airfoil 38C and the engine centerline axis A. Each of angles a, b and c are varied independently of the others and can be set to different angles, for example.

Figure 6B:
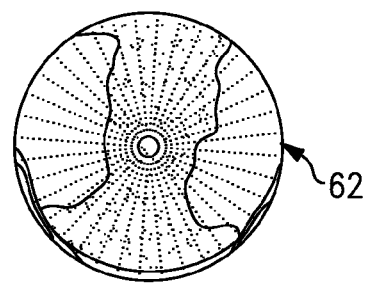
Figure 7:
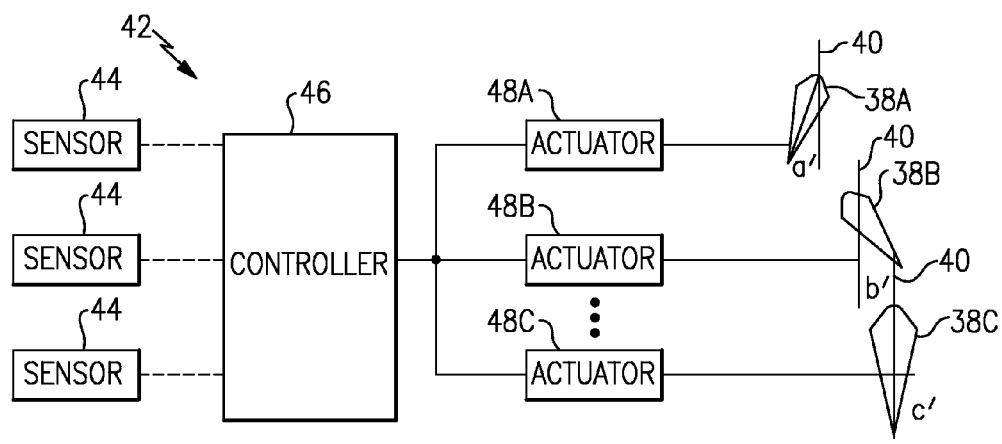
FIG. 7 is a schematic representation of an example positioning of a plurality of inlet guide vanes of the inlet guide vane assembly illustrated by FIG. 4.

FIG. 7 illustrates another example positioning of the inlet guide vanes 32 by the active control feedback system 42. In this example, the sensors 44 sense different pressures of the incoming airflow F (as compared to FIG. 4), The controller 46 receives the new output of the sensors 44 and creates a new distortion map 62 (See FIG. 6B) for the incoming airflow F at the inlet section 24. In response to the new pressure readings, the actuators 48A-48C alter the rotational position of each of the flap airfoils 38A-38C. That is, the flap airfoils 38A-38C are repositioned based upon the new output from the sensors 44.

For example, the flap airfoil 38A is pivotably varied from angle a to angle a', the flap airfoil 38B is pivotably varied from angle b to angle b' and the flap airfoil 38C is pivotably varied from angle c to angle c'. The active control feedback system 42 automatically varies the rotational position of each flap airfoil 38 of each inlet guide vane 32 in response to a change in the output from the sensors 44. That is, the active control feedback system 42 provides active management of the inlet guide vane assembly 26. In this way, the fan section 12 receives a more stabilized airflow that results in improved engine stability and fuel burn.

Figure 8:
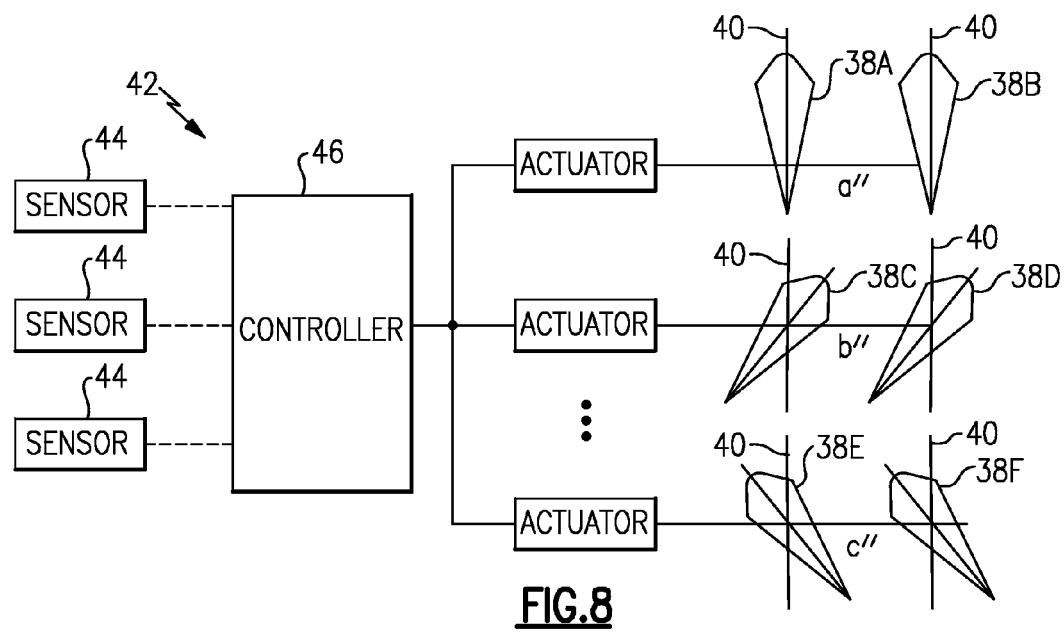
FIG. 8 is a schematic representation of an example sector positioning of a plurality of inlet guide vanes.

FIG. 8 illustrates sector positioning of the inlet guide vanes 32 by the active control feedback system 42. In this example, the flap airfoils 38A through 38F are pivoted in groups of two such that every flap airfoil 38 in a sector rotates together the same amount. For example, the flap airfoils 38A and 38B are positioned at angle a", the flap airfoils 38C and 38D are positioned at angle b", and the flap airfoils 38E and 38F are positioned at angle c". Although the present example illustrates sectors having two flap airfoils 38, it should be understood that each sector may include any number of inlet guide vanes 32 having any number of flap airfoils 38.

The foregoing description shall be interpreted as illustrative and not in any limiting sense. A worker of ordinary skill in the art would understand that certain modifications would come within the scope of this disclosure. For these reasons, the following claims should be studied to determine the true scope and content of this disclosure.

What is claimed is:

1. An inlet guide vane assembly, comprising:
   an active control feedback system; and
   a plurality of inlet guide vanes each variable between a plurality of positions, wherein a rotational position of each of said plurality of inlet guide vanes is individually varied in response to an output of said active control feedback system.

2. The assembly as recited in claim 1, wherein each of said plurality of inlet guide vanes include a strut airfoil and a flap airfoil.

3. The assembly as recited in claim 2, wherein a rotational position of each of said flap airfoils is individually pivotally varied in response to said output of said active control feedback system.

4. The assembly as recited in claim 1, wherein said active control feedback system includes a plurality of sensors, a controller and a plurality of actuators.

5. The assembly as recited in claim 4, wherein at least one of said plurality of sensors is mounted to each of said plurality of inlet guide vanes.

6. The assembly as recited in claim 4, wherein said plurality of sensors are mounted on each of an inner diameter and an outer diameter of an inlet section of a gas turbine engine.

7. The assembly as recited in claim 4, wherein said plurality of sensors include pressure sensors.

8. The assembly as recited in claim 1, wherein said plurality of inlet guide vanes are positioned in sectors within an assembly.

9. The assembly as recited in claim 1, comprising additional inlet guide vane assemblies positioned downstream from said inlet guide vane assembly.

10. The assembly as recited in claim 9, wherein a plurality of inlet guide vanes of said additional inlet guide vane assemblies are positioned in response to said output from said active control feedback system, wherein said output includes pressure readings from a plurality of sensors and an input from each inlet guide vane assembly positioned upstream from a portion of said plurality of inlet guide vanes being positioned.

11. A gas turbine engine, comprising:
    an inlet section;
    a compressor section, a combustor section, and a turbine section positioned downstream of said inlet section;
    a plurality of inlet guide vanes mounted adjacent said inlet section at a position that is
    upstream from said compressor section; and
    an active control feedback system having a plurality of sensors and a controller, wherein said controller receives pressure readings from said plurality of sensors and commands the positioning of each of said plurality of inlet guide vanes in response to said pressure readings.

12. The gas turbine engine as recited in claim 11, wherein said inlet section is a non-line of sight serpentine inlet section.

13. The gas turbine engine as recited in claim 11, wherein said active control feedback system includes an actuator associated with each of said plurality of inlet guide vanes, and said actuators are operable to position each of said plurality of inlet guide vanes in response to said commands.

14. The gas turbine engine as recited in claim 11, wherein said plurality of sensors are mounted at both inner diameters and outer diameters of said inlet section.

15. The gas turbine engine as recited in claim 11, wherein a rotational position of each of said plurality of inlet guide vanes is individually varied in response to said pressure readings.

16. The gas turbine engine as recited in claim 11, wherein said plurality of inlet guide vanes are positioned in sectors in response to said pressure readings.

17. The gas turbine engine as recited in claim 11, wherein said plurality of inlet guide vanes are positioned in sectors in response to said pressure readings and an input from each of said plurality of inlet guide vanes positioned upstream relative to a portion of said plurality of inlet guide vanes being positioned.

18. The gas turbine engine as recited in claim 11, wherein said plurality of inlet guide vanes are positioned individually in response to said pressure readings and an input from each of said plurality of inlet guide vanes positioned upstream relative to a portion of said plurality of inlet guide vanes being positioned.

19. A method of actively controlling a plurality of inlet guide vanes of a gas turbine engine, comprising the steps of:
    a) receiving an airflow at an inlet section of the gas turbine engine;
    b) sensing a pressure of the airflow at the inlet section; and
    c) individually varying a rotational position of each of the inlet guide vanes in response to sensing the pressure.

20. The method as recited in claim 19, comprising the step of:
    d) sensing a second, different pressure at the inlet section; and e) repositioning each of the inlet guide vanes in response to sensing the second, different pressure.

21. The method as recited in claim 19, wherein said step b) includes the steps of:
   mounting a plurality of pressure sensors at the inlet section of the gas turbine engine; and
   generating a distortion map of the airflow at the inlet section based upon the pressure sensed at said step b).

22. The method as recited in claim 21, wherein said step c) includes one of the steps of:
   individually positioning each of the inlet guide vanes in response to analysis of the distortion map; and
   positioning the inlet guide vanes in sectors.

23. The method as recited in claim 19, wherein a first portion of the inlet guide vanes are mounted upstream from a fan section of the gas turbine engine and a second portion of the inlet guide vanes are mounted downstream from the fan section, and said step c) includes
   positioning the first portion of the inlet guide vanes in response to the pressure sensed at said step b); and
   positioning the second portion of inlet guide vanes in response to at least one of the pressure sensed at said step b) and a positioning of the first portion of the inlet guide vanes.

24. The method as recited in claim 19, comprising the steps of:
   d) sensing a positioning of a plurality of upstream inlet guide vanes that are positioned upstream from the inlet guide vanes to be positioned in said step c); and
   e) positioning the inlet guide vanes in response to both the information sensed at said step d) and the pressure sensed at said step b).

25. An inlet guide vane assembly, comprising:
   an active control feedback system; and
   a plurality of inlet guide vanes each variable between a plurality of positions, wherein each of said plurality of inlet guide vanes is positioned in response to an output of said active control feedback system, each of said plurality of inlet guide vanes including a strut airfoil and a flap airfoil, and wherein a rotational position of each of said flap airfoils is individually pivotally varied in response to said output of said active control feedback system.

26. An inlet guide vane assembly, comprising:
   an active control feedback system that includes a plurality of pressure sensors, a controller and a plurality of actuators; and
   a plurality of inlet guide vanes each variable between a plurality of positions, wherein each of said plurality of inlet guide vanes is positioned in response to an output of said active control feedback system.

27. A gas turbine engine, comprising:
   an inlet section;
   a compressor section, a combustor section, and a turbine section positioned downstream of said inlet section;
   a plurality of inlet guide vanes mounted adjacent said inlet section; and
   an active control feedback system having a plurality of sensors and a controller, wherein said controller receives pressure readings from said plurality of sensors and commands the positioning of each of said plurality of inlet guide vanes in response to said pressure readings, wherein a rotational position of each of said plurality of inlet guide vanes is individually varied in response to said pressure readings.

28. A method of actively controlling a plurality of inlet guide vanes of a gas turbine engine, comprising the steps of:
   a) receiving an airflow at an inlet section of the gas turbine engine;
   b) sensing a pressure of the airflow at the inlet section;
   c) positioning each of the inlet guide vanes in response to sensing the pressure;
   f) sensing a second, different pressure at the inlet section; and
   g) repositioning each of the inlet guide vanes in response to sensing the second, different pressure.

* * * * *